United States Patent
Barnes

(10) Patent No.: US 9,668,617 B1
(45) Date of Patent: Jun. 6, 2017

(54) UTENSIL HOLDER FOR CHAFING DISHES AND THE LIKE

(71) Applicant: Darrell Barnes, Ontario, CA (US)

(72) Inventor: Darrell Barnes, Ontario, CA (US)

( * ) Notice: Subject to any disclaimer, the term of this patent is extended or adjusted under 35 U.S.C. 154(b) by 0 days.

(21) Appl. No.: 14/751,280

(22) Filed: Jun. 26, 2015

(51) Int. Cl.
*A47G 21/14* (2006.01)
*A47J 43/28* (2006.01)
*A47J 47/16* (2006.01)

(52) U.S. Cl.
CPC ............ *A47J 43/287* (2013.01); *A47J 47/16* (2013.01)

(58) Field of Classification Search
CPC ....... A47J 43/287; A47J 47/16; A47G 21/145; A45F 3/46
See application file for complete search history.

(56) References Cited

U.S. PATENT DOCUMENTS

| | | | | |
|---|---|---|---|---|
| 807,840 | A * | 12/1905 | Martin et al. .......... | A47G 21/14 248/229.16 |
| 975,858 | A * | 11/1910 | Guy ....................... | A47G 21/14 248/229.16 |
| 1,182,732 | A * | 5/1916 | Avery ................... | A47J 43/287 248/229.26 |
| 1,234,509 | A * | 7/1917 | Tetrault ................. | A47J 43/287 248/213.2 |
| 1,305,777 | A * | 6/1919 | Cunningham ......... | A47G 21/14 248/213.2 |
| 1,472,995 | A * | 11/1923 | Simone ................. | A47J 43/287 248/229.26 |
| 1,928,995 | A * | 10/1933 | De Biasi ................ | A47J 36/12 220/735 |
| 2,286,012 | A * | 6/1942 | Rochow ................. | A47G 29/08 220/483 |
| 2,298,901 | A * | 10/1942 | Pickering ............. | A47G 21/145 248/37.6 |
| 2,371,537 | A * | 3/1945 | Mangini ............... | A47J 43/287 211/70.7 |
| 2,530,470 | A * | 11/1950 | Kenly ................... | A47J 43/287 24/338 |
| 2,590,286 | A * | 3/1952 | Wirtanen ............. | A47G 21/145 248/37.6 |
| 2,664,005 | A * | 12/1953 | Kosinski ................ | A47J 47/16 126/221 |
| 2,900,151 | A * | 8/1959 | Sims ..................... | A47J 43/287 248/37.3 |
| 2,919,086 | A * | 12/1959 | McMahan ............ | A47G 21/145 206/818 |
| 4,632,347 | A * | 12/1986 | Jurgich ................ | A47G 21/145 211/70.6 |
| 4,967,914 | A * | 11/1990 | Keeton .................. | A47G 21/14 211/70.7 |
| 5,127,616 | A * | 7/1992 | Carney .................. | A47J 47/16 211/41.11 |
| 5,396,993 | A * | 3/1995 | Spitler .................... | A47J 47/16 211/41.2 |
| 5,558,308 | A * | 9/1996 | Edris ..................... | A47G 21/14 211/70.7 |

(Continued)

*Primary Examiner* — Bradley Duckworth
(74) *Attorney, Agent, or Firm* — Kenneth Avila

(57) ABSTRACT

Means attachable to any serving vessel, such as a pan, chafing dish or the like for holding utensils adjacent the particular serving vessel to keep the utensils immediately and safely available for use, while discouraging the utensils from one serving vessel from being used to serve food from a different serving vessel.

6 Claims, 5 Drawing Sheets

(56) References Cited

U.S. PATENT DOCUMENTS

| | | | | |
|---|---|---|---|---|
| 5,678,790 A * | 10/1997 | Dwyer | A47J 43/287 | 211/70.7 |
| 5,730,405 A * | 3/1998 | Nichols, IV | A47J 43/287 | 248/213.2 |
| 5,887,830 A * | 3/1999 | Liang | A47G 21/145 | 211/70.7 |
| 5,979,673 A * | 11/1999 | Dooley | A47J 47/16 | 211/41.11 |
| 6,435,358 B1 * | 8/2002 | Decal | A47G 21/14 | 211/70.7 |
| 6,505,746 B1 * | 1/2003 | Johnson | A47J 47/16 | 211/70.7 |
| 6,792,960 B2 * | 9/2004 | Peele | A61L 2/26 | 134/104.2 |
| 6,948,626 B1 * | 9/2005 | Duncan | A47J 47/16 | 211/70.7 |
| 7,485,831 B2 * | 2/2009 | Tynes | A47J 27/004 | 206/216 |
| D603,660 S * | 11/2009 | Holcomb | D7/637 | |
| 7,673,759 B2 * | 3/2010 | Stukenberg | A47G 1/1646 | 211/41.7 |
| 8,317,138 B1 * | 11/2012 | Johnson, Jr. | A47G 21/145 | 206/349 |
| 8,453,977 B2 * | 6/2013 | Zoland | A61B 50/10 | 206/352 |
| 8,684,192 B1 * | 4/2014 | Margolin | A47J 47/20 | 211/41.3 |
| 8,740,159 B2 * | 6/2014 | Braun | A47J 36/12 | 211/41.11 |
| 2002/0158031 A1 * | 10/2002 | Powers | A47J 47/16 | 211/41.11 |
| 2003/0000396 A1 * | 1/2003 | Leonard | A47J 36/24 | 99/482 |
| 2006/0236875 A1 * | 10/2006 | Carr | A47J 47/16 | 99/485 |
| 2008/0041757 A1 * | 2/2008 | Nelson | A47G 21/14 | 206/553 |
| 2009/0050585 A1 * | 2/2009 | Lindgren | A47L 15/505 | 211/70.7 |
| 2012/0139400 A1 * | 6/2012 | Hofpeter | A47L 15/505 | 312/228.1 |
| 2013/0002107 A1 * | 1/2013 | Paschini | A47L 15/502 | 312/228.1 |
| 2013/0175232 A1 * | 7/2013 | Barnes | A47G 21/145 | 211/70.7 |
| 2015/0014495 A1 * | 1/2015 | Bausman | A47J 47/16 | 248/176.2 |
| 2015/0108286 A1 * | 4/2015 | Barnes | A47J 43/287 | 248/37.6 |

* cited by examiner

UTENSIL HOLDER FOR CHAFING DISHES AND THE LIKE

RELATED CASES

This application is a Continuation-In-Part of Ser. No. 14/444,042, filed Jul. 28, 2014 and now abandoned and this invention is described in my previous patent application Ser. No. 13/323,718, filed Jan. 9, 2012 and now abandoned.

FIELD OF INVENTION

This invention relates to devices for serving food and is particularly directed to improved means for holding utensils for use with professional chafing dishes and the like.

BACKGROUND

In commercial cooking, food is prepared in large quantities and is placed in serving vessels, such as pans, chafing dishes or the like to be kept warm until it is served. At that time, utensils, such as spoons, spatulas, forks or the like, are used to transfer the food from the serving vessels to the individual serving plates. However, between servings, the utensils are usually returned to the serving vessel with the handle resting on the edge of the serving vessel. Unfortunately, this causes the handle of the utensil to project outwardly from the serving vessel, putting it at risk of being accidentally hit by a passer-by and knocked out of the serving vessel, splattering some of the food and causing the spilled food and the utensil to fall onto the floor. Obviously, when this occurs, the mess must be cleaned up and new utensils must be provided to replace the ones which have fallen on the floor. Alternatively, the utensil may be placed on the table, rather than in the proper serving vessel, and may be used to deliver food from a different serving vessel, thereby contaminating the food in both serving vessels. These problems cause considerable unnecessary work for the employees and add significantly to the cost of preparing the food. Unfortunately, the prior art has provided no solution for these problems.

BRIEF SUMMARY AND OBJECTS OF INVENTION

These disadvantages of the prior art are overcome with the present invention and means are provided for storing utensils safely and cleanly and for allowing them to be immediately available for use, while discouraging the use of the utensils to serve from other serving vessels.

These advantages of the present invention are preferably attained by providing means attachable to any serving vessel, such as a chafing dish or the like, for holding serving utensils adjacent the particular chafing dish to keep the utensils immediately and safely available for use, while discouraging the utensils from one serving vessel from being used to serve food from a different serving vessel.

Accordingly, it is an object of the present invention to provide improved means for storing serving utensils.

Another object of the present invention is to provide improved means for storing serving utensils safely and cleanly.

An additional object of the present invention is to provide means for storing serving utensils safely and cleanly and for allowing them to be immediately available for use.

A further object of the present invention is to provide improved means for storing utensils safely and cleanly and for allowing them to be immediately available for use, while discouraging the use of the utensils to serve from other serving vessels.

Another object of the present invention is to provide means attachable to any serving vessel, such as a pan, chafing dish or the like for holding utensils.

A specific object of the present invention is to provide means attachable to any serving vessel, such as a pan, chafing dish or the like for holding utensils adjacent the particular serving vessel to keep the utensils immediately and safely available for use, while discouraging the utensils from one serving vessel from being used to serve food from a different serving vessel.

These and other objects and features of the present invention will be apparent from the following detailed description, taken with reference to the figures of the accompanying drawing.

DETAILED DESCRIPTION OF THE INVENTION

Figure 1:
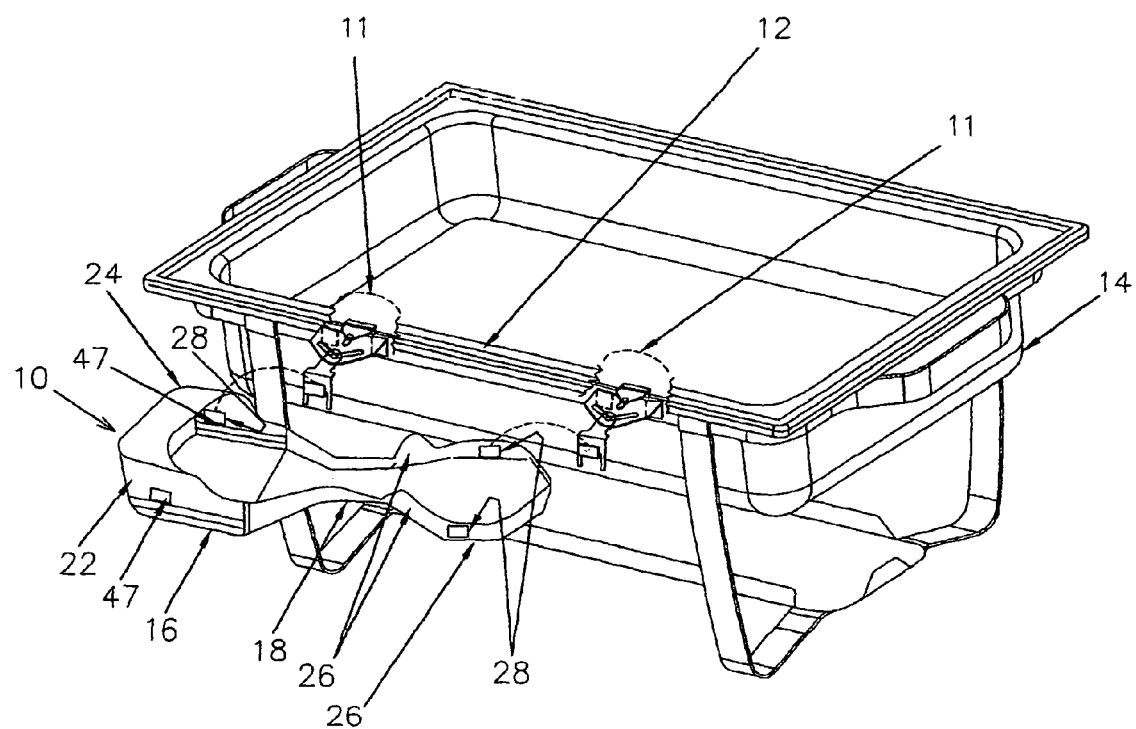
FIG. 1 is an isometric view of a utensil holder and attaching adapter embodying the present invention attached to a serving vessel.
Figure 2:
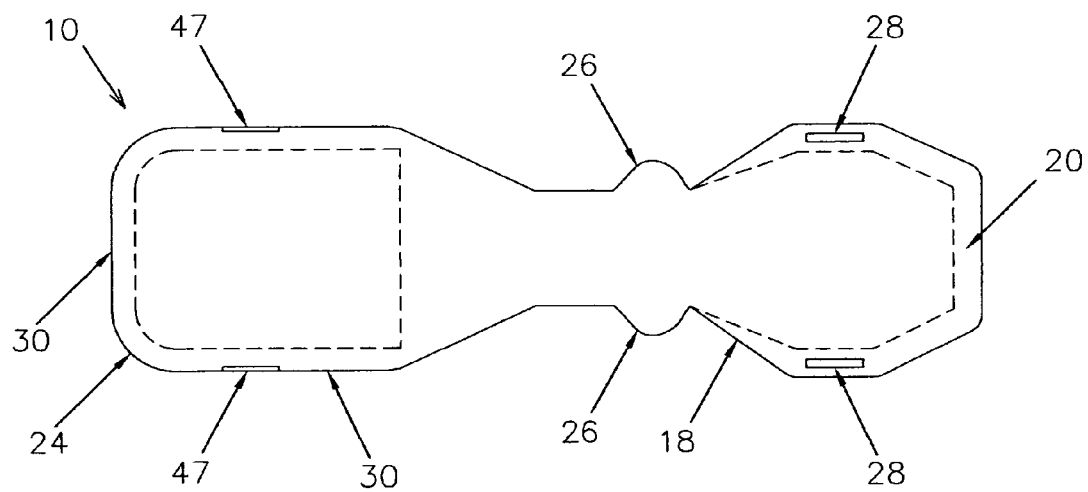
FIG. 2 is a plan view of the utensil holder of FIG. 1.
Figure 3:
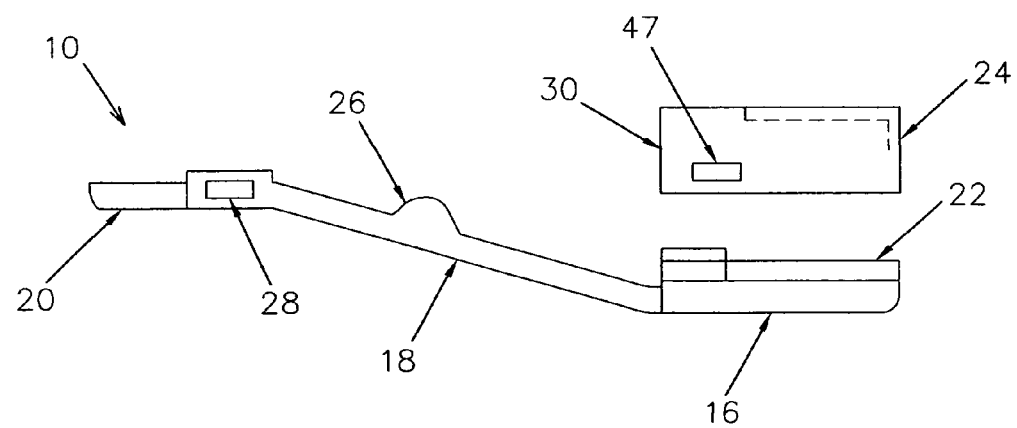
FIG. 3 is an exploded right side view of vertical section through the utensil holder of FIG. 1.
Figure 4:
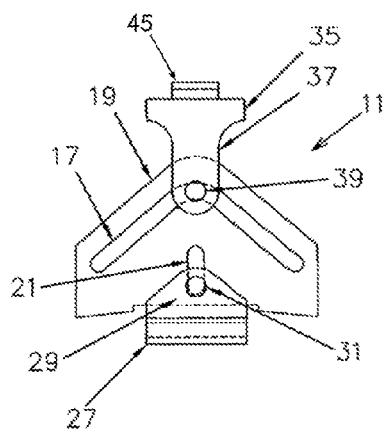
FIG. 4 is a plan view of the adapter of FIG. 1.
Figure 5:
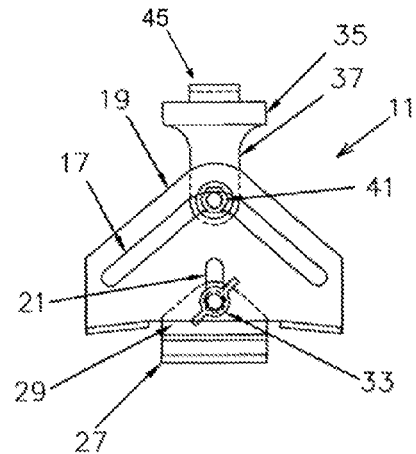
FIG. 5 is a bottom view of the adapter of FIG. 1.
Figure 6:
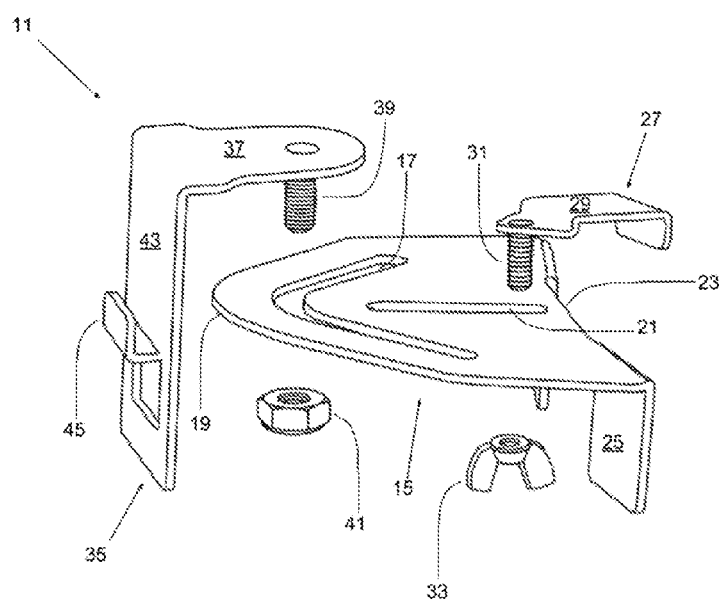
FIG. 6 is an exploded view of the adapter of FIG. 1.

In that form of the present invention chosen for purposes of illustration, FIG. 1 shows a utensil holder, indicated generally at 10, attached by suitable adapters 11 to the sidewall 12 of a serving vessel 14, such as a pan, chafing dish or the like. As best seen in FIGS. 2 and 3, the utensil holder 10 comprises a first lower flat portion 16 connected to an upwardly inclined portion 18 and a second upper flat portion 20. The lower flat portion 16 has vertical side walls 22 extending about the periphery thereof and a lid 24 extending over the front section of the lower flat portion 16. The inclined portion 18 has a pair of flanges 26 extending upwardly and outwardly from both sides of the inclined portion 18. Finally, openings 28 are provided on the side walls 22 of the lower flat portion 16 and the sides of the lid 24 to receive the hook portion 45 of the adapters 11 to releasably attach the utensil holder 10 to the sidewall 12 of the serving vessel 14. As seen in FIGS. 1 and 4-6, the adapters 11 have a generally triangular base portion 15 having a slot 17 extending parallel to the V-shaped inner edge 19 thereof and having a second slot 21 extending perpendicular to the rear edge 23. A wall 25 extends perpendicularly downward from the rear edge 23. A generally L-shaped clamp member 27 has a horizontal portion 29 which overlies the base portion 15 and has a bolt 31 which projects slideably through the second slot 21 to receive nut 33 to clamp the clamp member 27 in an adjusted position along the second slot 21 to releasably attach the adapter 11 to the serving vessel 14. An attaching member 35 has a horizontal portion 37 having a bolt 39 slideably engaging the slot 17 of the adapter 11 and the bolt 39 carries a nut 41 to secure the bolt 39 and attaching member 35 to a desired adjusted position along slot 17. Also, the attaching member 35 has a front wall 43 extending perpendicularly downward from the horizontal portion 37 and having a hook portion 45 projecting forwardly therefrom to engage the openings 28 in the utensil holder 10 to releasably attach the utensil holder 10 to the serving vessel 14.

The lid 24 of the utensil holder 10 may be removed, as seen in FIG. 1, and has side walls 30 which mate with the side walls 22 of the lower flat portion 16 to allow the lid 24 to be removably mounted on the side walls 22 of the lower flat portion 16. Openings 47 are formed in the side walls 30 of the lid 24 to receive the hook portions 45 of adjacent adapters 17 to assist in attaching the utensil holder 10 to the serving vessel 14.

In use, a plurality of serving vessels 14 are placed on a serving table and individual utensil holders 10 are attached to each one of the serving vessels 14 by suitable means, such as adapters 11. The appropriate serving utensil, not shown, for each serving vessel 14 is placed on the associated utensil holder 10 with the serving portion of the utensil resting on the lower flat portion 16 of the utensil holder 10 and the handle of the utensil resting on the upper flat portion 20. If desired, a lid 24 may be placed on the side walls 22 of the lower flat portion 16 to prevent airborne matter from landing on the serving portion of the utensil. Since each utensil holder 10 is attached to a respective serving vessel 14, the utensil appropriate for that serving vessel 14 will be immediately available and since the utensil holder 10 is attached to the serving vessel 14 and lies parallel to it, there is little likelihood that the utensil will accidentally be bumped or knocked onto the floor. Moreover, since each serving vessel 14 has a respective utensil holder 10 attached thereto, the proper utensil for each serving vessel 10 will be immediately and safely available, so there is little likelihood of the utensil for one serving vessel 14 being used on an improper serving vessel 14. Also, it will be seen that, by suitably positioning the hook portions 45 of the adapters 11 along the associated slots 17, the adapters 11 may be adapted to attach the utensil holders 10 to serving vessels 14 of substantially and shape.

Figure 7:
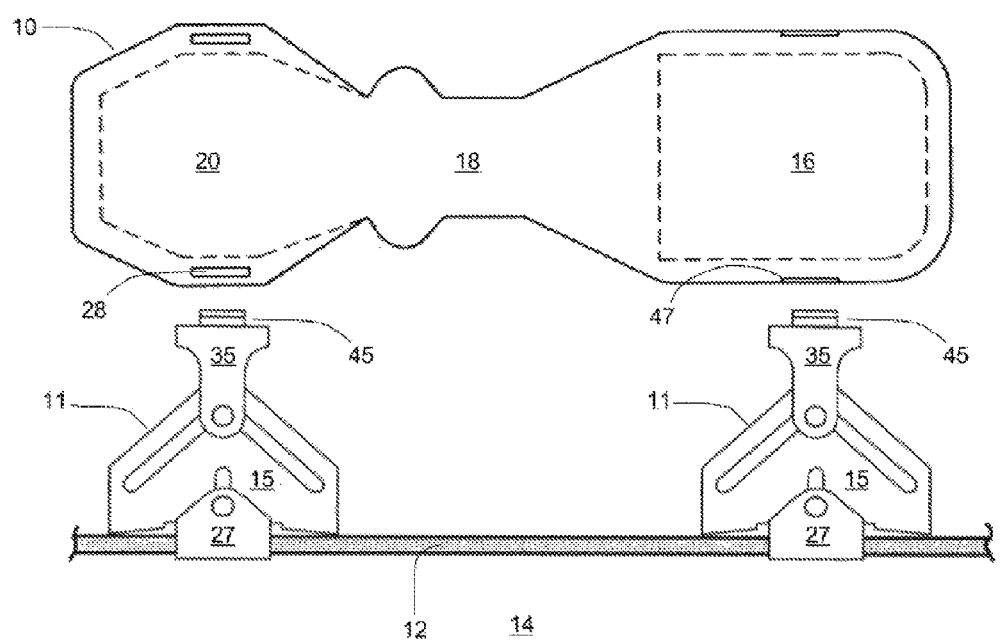
FIG. 7 is a plan view of the utensil holder of FIG. 1 connected to a rectangular serving vessel using the adapter of FIG. 1.
Figure 8:
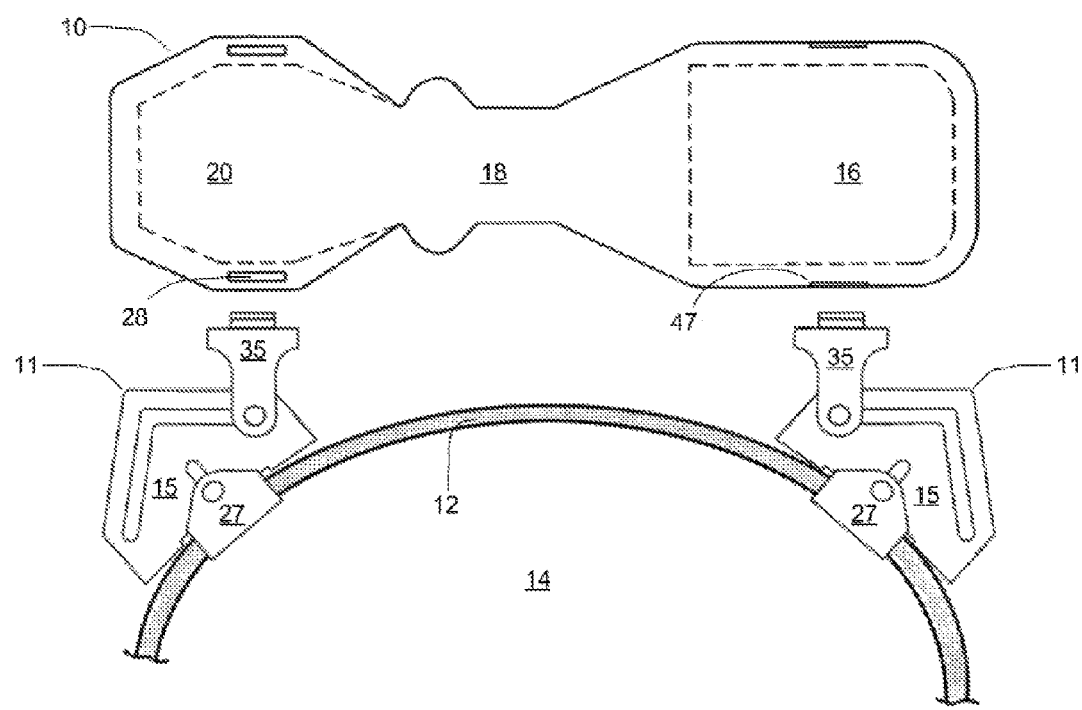
FIG. 8 is a plan view of the utensil holder of FIG. 1 connected to a oval or circular serving vessel using the adapter of FIG. 1.

FIGS. 7 and 8 shows the utensil holder 10 attached to a serving vessel 14 using the adapters 11. In FIG. 7 the serving vessel 14 is rectangular while in FIG. 8 the serving vessel 14 is oval or circular in shape. The purpose of FIGS. 7 and 8 is to show how attaching member 35, clamp member 27, and base portion 15 of adapters 11 may be arranged so as to allow hook member 45 to engage opening 28 in upper flat portion 20 of utensil holder 10 and opening 47 in lower flat portion 16 of utensil holder 10 thereby allowing utensil holder 10 to be positioned alongside wall 12 of serving vessel 14.

Obviously, numerous variations and modifications can be made without departing from the spirit of the present invention. Therefore, it should be clearly understood that the forms of the preset invention described above and shown in the figures of the accompanying drawing are illustrative only and are not intended to limit the scope of the present invention.

What is claimed is:

1. A utensil holder for serving vessels having a side wall, said utensil holder comprising:
   means for holding a utensil being generally rectangular and flat with a wall about the circumference thereof containing openings, and
   means for attaching said holding means to said serving vessels comprising:
      a base member having a V-shaped front edge and a rear edge; a first slot extending generally parallel to said front edge; a second slot positioned centrality and extending perpendicular along said rear edge; and a rear wall extending downwardly from said rear edge,
      a clamping member having a horizontal portion carrying a bolt slideably mounted in said second slot; a rear wall extending downwardly from a rear edge of said horizontal portion being one half of a mechanism to clamp a attaching means to said serving vessel with said rear wall of said base member being the other half of the mechanism; and a nut releasably securing said bolt in a desired position along said second slot, and
      an attaching member having a horizontal portion carrying a bolt slideably mounted in said first slot; a nut for releasably securing said bolt in a desired position along said first slot; and a front wall extending downwardly from a front edge of said horizontal portion and containing a hook portion to engage one of said openings in said holding means.

2. The device of claim 1 wherein:
said attaching means attaches said holding means to lie parallel to said side wall of said serving vessel.

3. The device of claim 1 wherein:
said serving vessel is a chafing dish.

4. The device of claim 1 wherein:
said serving vessel is a pan.

5. The device of claim 1 wherein:
said holding means has a lower flat portion, an upper flat portion, and an inclined portion connecting said flat portions.

6. The device of claim 1 wherein:
said attaching means are adjustable to attach to serving vessels with linear or curved edges.

* * * * *